(12) United States Patent
Yosef

(10) Patent No.: US 9,130,332 B2
(45) Date of Patent: Sep. 8, 2015

(54) METHOD AND APPARATUS FOR PROTECTIVE ENCASEMENT FOR MOBILE ELECTRONIC DEVICES

(71) Applicant: Itav Yosef, Atlantic Highlands, NJ (US)

(72) Inventor: Itav Yosef, Atlantic Highlands, NJ (US)

(*) Notice: Subject to any disclaimer, the term of this patent is extended or adjusted under 35 U.S.C. 154(b) by 2 days.

(21) Appl. No.: 14/194,843

(22) Filed: Mar. 3, 2014

(65) Prior Publication Data

US 2014/0273562 A1    Sep. 18, 2014

Related U.S. Application Data

(60) Provisional application No. 61/780,184, filed on Mar. 13, 2013.

(51) Int. Cl.
| | |
|---|---|
| H01R 31/06 | (2006.01) |
| H04M 1/04 | (2006.01) |
| H04M 1/02 | (2006.01) |
| H04M 1/18 | (2006.01) |
| H04M 1/725 | (2006.01) |

(52) U.S. Cl.
CPC ............... *H01R 31/06* (2013.01); *H04M 1/04* (2013.01); *H04M 1/0274* (2013.01); *H04M 1/18* (2013.01); *H04M 1/72575* (2013.01); *Y10T 29/49117* (2015.01); *Y10T 29/49208* (2015.01)

(58) Field of Classification Search
CPC ....... H01R 35/04; H01R 23/025; H01R 31/06; H01R 13/60; H01R 2201/06
USPC .......................... 439/446, 218, 131; 235/380
See application file for complete search history.

(56) References Cited

U.S. PATENT DOCUMENTS

| | | | |
|---|---|---|---|
| 7,510,420 B2 * | 3/2009 | Mori .............................. | 439/446 |
| 2006/0208066 A1 * | 9/2006 | Finn et al. ...................... | 235/380 |

* cited by examiner

*Primary Examiner* — Abdullah Riyami
*Assistant Examiner* — Marcus Harcum
(74) *Attorney, Agent, or Firm* — Walter J. Tencza, Jr.

(57) ABSTRACT

An apparatus including a housing, and a standard media plug connector rotatably mounted to the housing, so that the standard media plug connector can be rotated in a first plane, which is substantially perpendicular to a back surface of the housing, from a first orientation wherein the standard media plug connector is substantially parallel to the back surface of the housing to a second orientation wherein the standard media plug connector is substantially perpendicular to the back surface of the housing. The housing may be configured to be attached to a mobile electronic communications device. The apparatus may further include an electronic device connector which is configured to be connected to a data port of the mobile electronic communications device, while the housing is attached to the mobile electronic communications device. The apparatus may further include a mounting bracket to which the standard media plug connector is rotatably mounted.

24 Claims, 10 Drawing Sheets

METHOD AND APPARATUS FOR PROTECTIVE ENCASEMENT FOR MOBILE ELECTRONIC DEVICES

CROSS REFERENCE TO RELATED APPLICATION(S)

The present application claims the priority of U.S. Provisional patent application Ser. No. 61/780,184, titled "Protective Encasement with built-in universal media plug connectors used for power charging, interfacing, data transfer and physical mounting of mobile electronic devices", filed on Mar. 13, 2013.

FIELD OF THE INVENTION

This invention relates to improved methods and apparatus concerning encasements for mobile electronic devices.

BACKGROUND OF THE INVENTION

Many mobile electronic devices, such as mobile smart phones, tablet computers, and laptop computers, use and/or require various accessories. These accessories may include battery chargers, cables, and mounting mechanisms, which may be needed in various settings. These accompanying device accessories generally need to be purchased separately, are heavy and cumbersome to carry, are not physically attached to the mobile device, and are therefore often forgotten when on the go.

An example of a setting in which one of these accessories may be needed is the use of a mobile telephone by a driver in an automobile. Often, a separate mounting mechanism must be used to mount the mobile telephone in an accessible location. In addition, a car charger typically must be used to charge the mobile telephone or other mobile device and a separate data cable must be connected between the mobile telephone and the car radio.

Known mobile device cases which have either a mounting mechanism, a battery or a charger, built in them are very bulky, heavy and cumbersome. Additionally, a plug connector of a cell phone used for charging the cell phone, is not standardized across the world and cannot be used universally without having to purchase an appropriate plug connection adapter when traveling.

SUMMARY OF THE INVENTION

One or more embodiments of the present invention provide a built-in universal media plug connector, such as a USB (universal serial Bus), stereo, HDMI (high definition multimedia interface), RCA connector (also called a phono connector or cinch connector, a type of electrical connector used to carry audio and video signals, RCA stands for Radio Corporation of America), rather than a built-in charger to reduce the overall weight and bulk of a mobile device protective encasement.

The universal media plug connector use in one or more embodiments of the present invention are configured to connect to different standard media port types located anywhere in the world on various host devices such as powered USB (universal serial bus) ports in the car or home, personal computers, audio/Video receivers, televisions and car radios. One or more embodiments of the present invention functions simultaneously to protect, mount, charge, and prop the mobile device as well as to exchange data and interface with the host device it is connected to.

An example of one embodiment of the present invention is mounting a mobile phone directly onto a USB outlet of a car radio. The mobile phone is thereby mounted in an accessible location and is simultaneously charged by the car radio. The mobile phone can also be used to control and interact with the car radio for playing music, video, using GPS or any other available feature. All these functions are done without the use of an external cable or mounting mechanism.

One or more embodiments of the present application provide an apparatus comprising a housing having a back surface, and a standard media plug connector rotatably mounted to the housing, so that the standard media plug connector can be rotated in a first plane, which is substantially perpendicular to the back surface of the housing, from a first orientation wherein the standard media plug connector is substantially parallel to the back surface of the housing to a second orientation wherein the standard media plug connector is substantially perpendicular to the back surface of the housing. The housing may be configured to be attached to a mobile electronic communications device.

The apparatus may further include an electronic device connector which is configured to be connected to a data port of the mobile electronic communications device, while the housing is attached to the mobile electronic communications device. The electronic device connector may be mounted to the housing and may be electronically connected to the standard media plug connector. The apparatus may further include a mobile electronic communications device. The apparatus may further include a mounting bracket to which the standard media plug connector is mounted. The mounting bracket may be rotatably mounted to the housing such that the mounting bracket is configured to rotate in a second plane which is substantially parallel to the back surface of the housing, while the standard media plug connector is substantially parallel to the back surface of the housing. The mounting bracket may be rotatably mounted to the housing such that the mounting bracket is configured to rotate in the second plane, while the standard media plug connector is substantially perpendicular to the back surface of the housing. The standard media plug connector may be a universal serial bus connector.

In at least one embodiment, a method is provided comprising the steps of attaching a housing to a mobile electronic communications device; wherein the housing has a back surface; wherein a standard media plug connector is rotatably mounted to the housing, so that the standard media plug connector can be rotated in a first plane, which is substantially perpendicular to the back surface of the housing, from a first orientation wherein the standard media plug connector is substantially parallel to the back surface of the housing to a second orientation wherein the standard media plug connector is substantially perpendicular to the back surface of the housing.

The method may further include connecting the standard media plug connector to a universal serial bus port. The method may also include connecting an electronic device connector to a data port of the mobile electronic communications device, while the housing is attached to the mobile electronic communications device, wherein the electronic device connector is mounted to the housing and is electronically connected to the standard media plug connector.

The standard media plug connector may be mounted to a mounting bracket as previously described. The standard media plug connector may be a universal serial bus connector.

DETAILED DESCRIPTION OF THE DRAWINGS

Figure 1A:
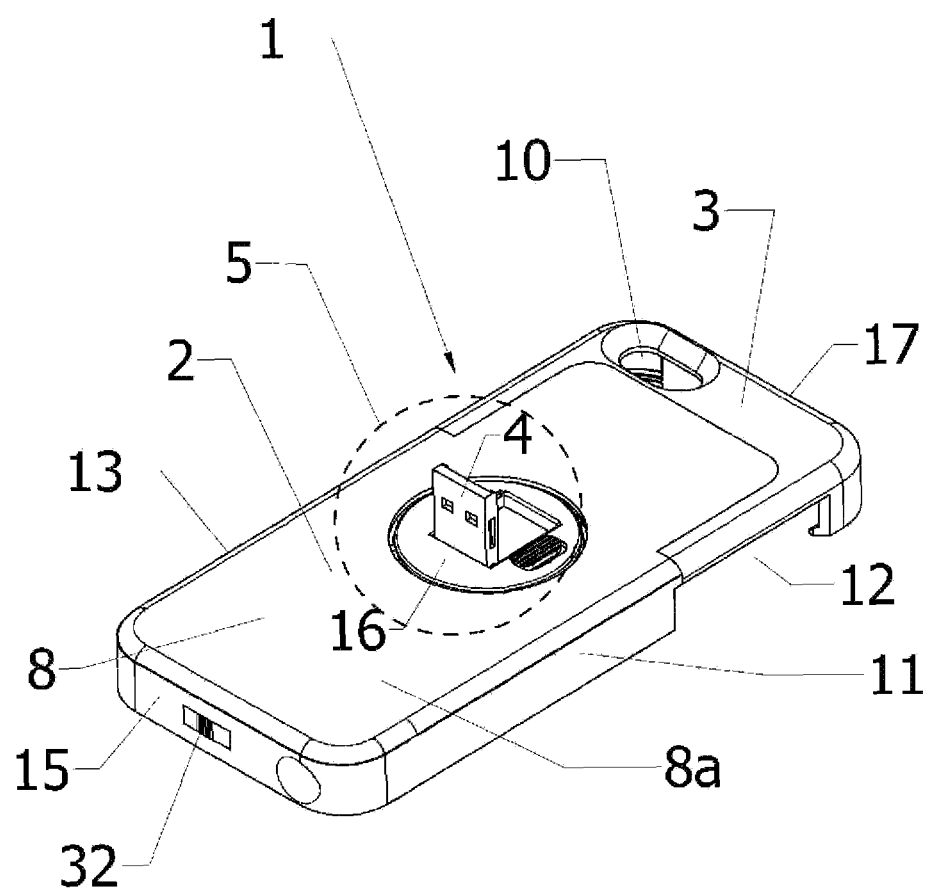
FIG. 1A shows a bottom, back, and right side perspective view of an apparatus in accordance with an embodiment of the present invention.
Figure 1B:
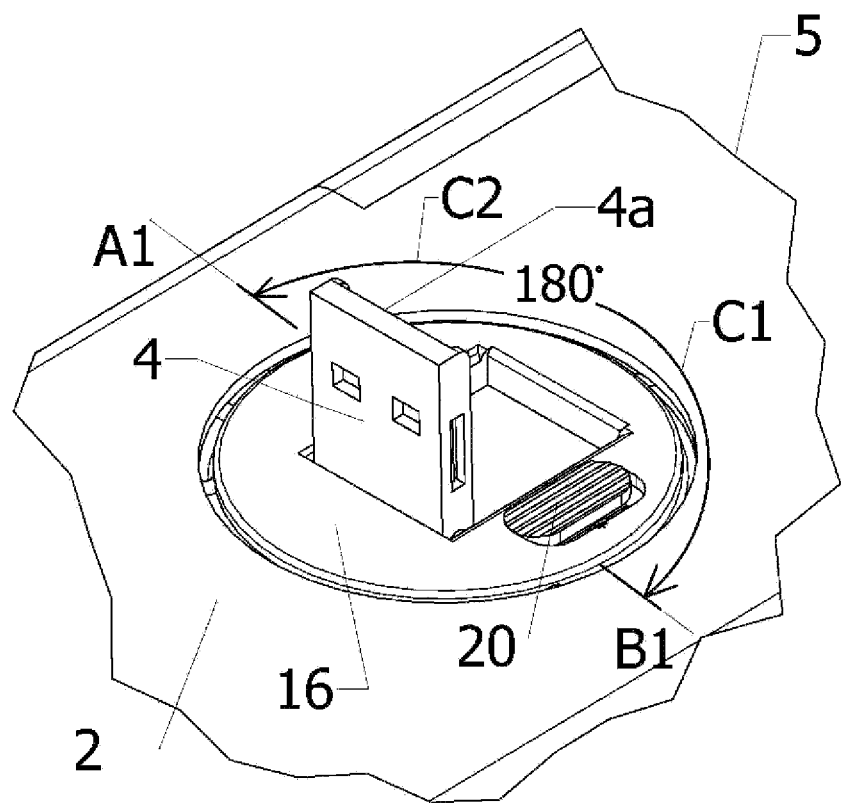
FIG. 1B shows a close up view of a portion of the apparatus of FIG. 1A.
Figure 2:
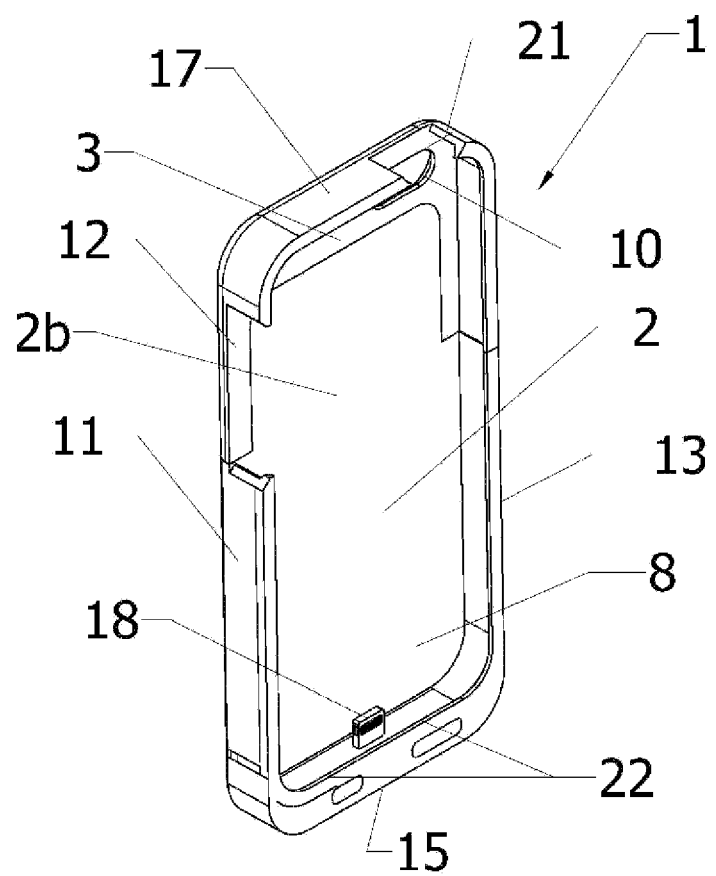
FIG. 2 shows a right side and front perspective view of the apparatus of FIG. 1A.

FIG. 1A shows a bottom, back, and right side perspective view of an apparatus 1 in accordance with an embodiment of the present invention. FIG. 1B shows a close up view of a portion of the apparatus 1 of FIG. 1A. FIG. 2 shows a right side and front perspective view of the apparatus 1 of FIG. 1A.

The apparatus 1 includes a body section or housing 2, a right side 13, a left side 11, bottom side or section 15, and a top side or section 17. The body section or housing 2 may include an upper section 3 and a lower section 8, as shown by FIGS. 1A and 2. The upper section 3 and the lower section 8 may be two separate parts which connect together mechanically or may be integrated or molded together as one unit.

The apparatus 1 also includes a standard media plug connector 4, which may be a thinner type of USB (universal serial bus) plug or another standard media plug connector. The apparatus 1 also includes a rotating and collapsible circular plug holder 16. The standard media plug connector 4 may be held in place or fixed to and/or within the collapsible plug holder 16, so that the connector 4 can be rotated from a closed or recessed position (shown in FIG. 3A) to an open position as shown in FIG. 1A. The standard media plug 4 is attached mechanically to the adjustable mounting bracket or collapsible circular plug holder 16. Mounting bracket 16 can be rotated ninety degrees in the counterclockwise direction C2 from the orientation shown in FIG. 1B to a position where the contact side 4a of standard media plug connector 4 is perpendicular to the line A1 and the line B1. Mounting bracket 16 can also be rotated ninety degrees in the clockwise direction C1 from the orientation shown in FIG. 1B to a position where the contact side 4a of the standard media plug connector 4 is perpendicular to the line B1 and the line A1. This is a total of one hundred and eighty degrees of movement, and allows for vertical or horizontal mounting of the apparatus 1 together with a smart phone, such as smart phone 100 shown in FIGS. 3A and 3B, regardless of the existing orientation of the media plug outlet (as shown by FIGS. 4A-4D).

The adjustable mounting bracket 16 connects the collapsible standard media plug 4 to the body section 2. The standard media plug connector 4 collapses into the interior body of the adjustable mounting bracket 16 which is located inside of the body section 2. Additionally, the standard media plug connector 4 is connected to individual electronic device connector 18 shown in FIG. 2, by means of an internal wire harness or conductor 30 and a data switch 32, shown in FIG. 6B, located with the internal structure or walls of the body section 2 as shown in FIG. 1A. The data switch 32 is located on side 15 on bottom section 8.

The apparatus 1 also includes a lower section 8 of the body section 2. The lower section 8 has a back surface 8a, shown in FIG. 1A, and a front surface 8b, shown in FIG. 2.

Figure 3A:
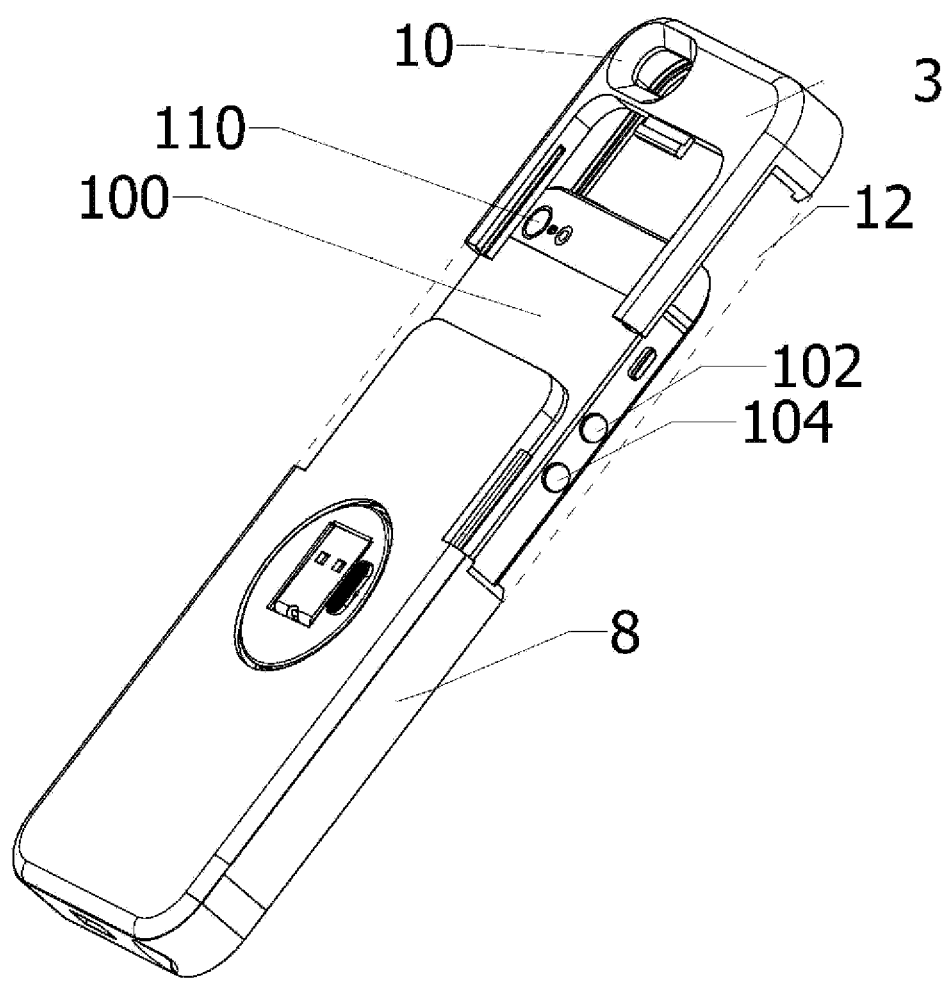
FIG. 3A shows a bottom, back, and right side perspective view of the apparatus of FIG. 1A along with a smart phone, with an upper section of the apparatus of FIG. 1A separated from a lower section of the apparatus of FIG. 1A.
Figure 3B:
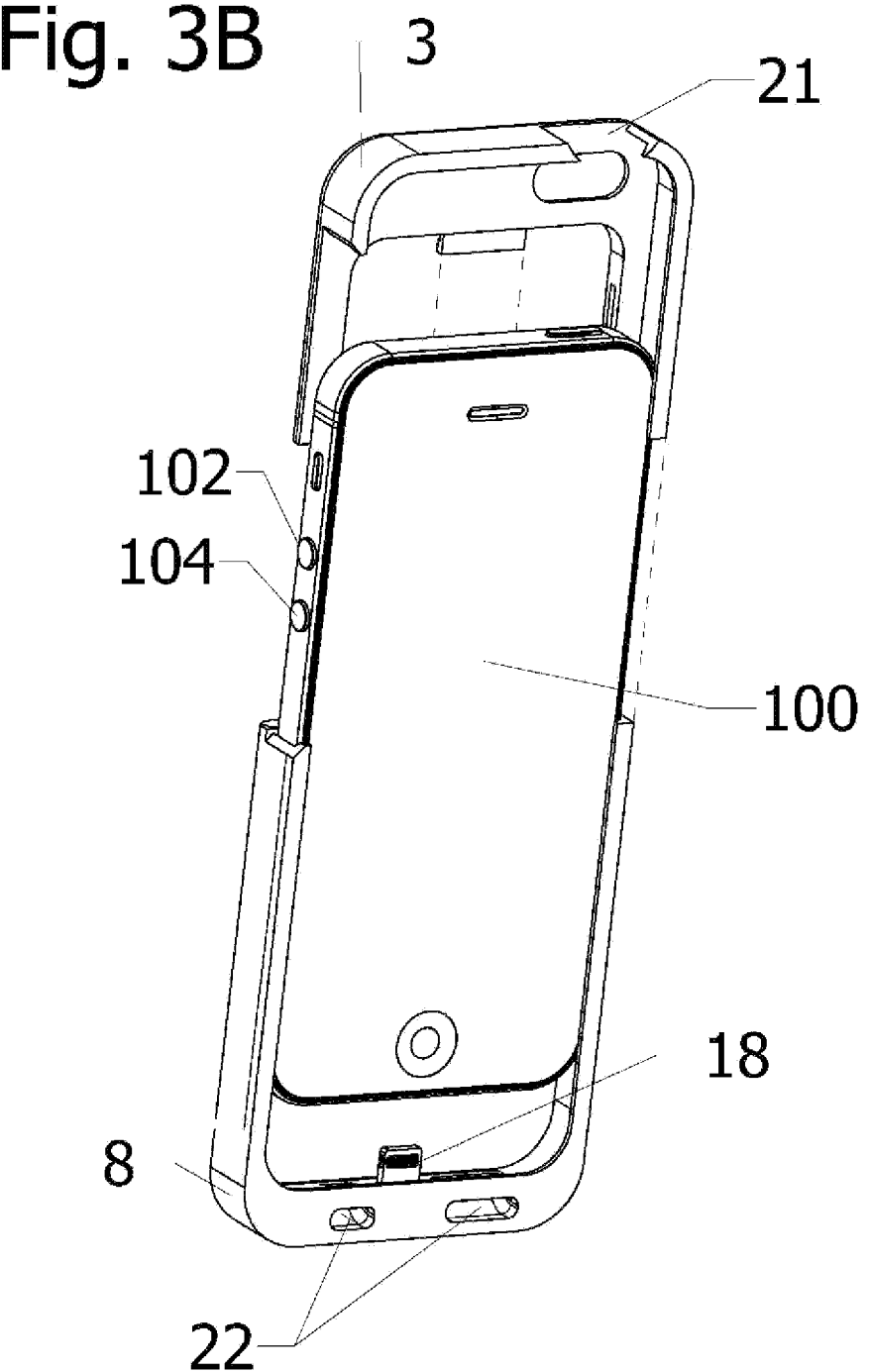
FIG. 3B shows a right side, and front perspective view of the apparatus of FIG. 1A along with the smart phone, and with the upper section of the apparatus of FIG. 1A separated from the lower section of the apparatus of FIG. 1A.
Figure 4A:
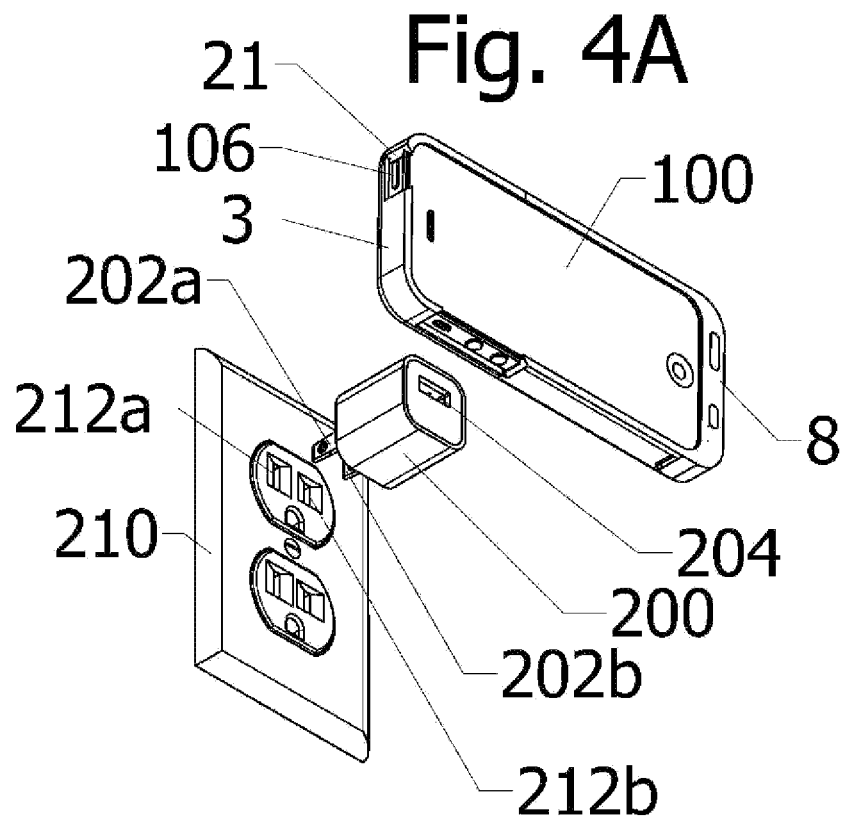
FIG. 4A shows a right side, top, and front perspective view of the apparatus of FIG. 1A, and the smart phone, with the upper section and the lower section of the apparatus of FIG. 1A connected together, and also a perspective view of an electrical outlet, and an electrical to USB adapter.
Figure 4C:
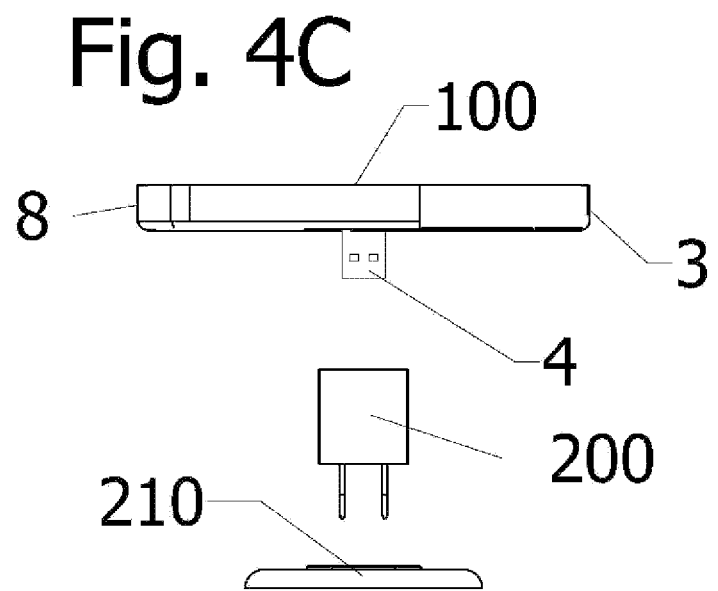
FIG. 4C shows a right side view of electrical outlet, electrical to USB adapter, and the apparatus of FIG. 1A with the smart phone.
Figure 4B:
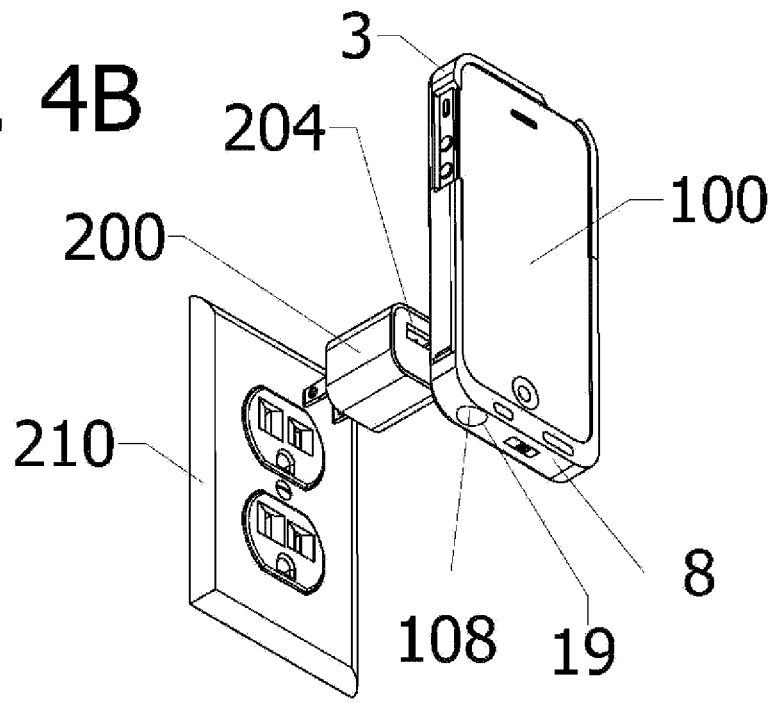
FIG. 4B shows a right side, bottom, and front perspective view of the apparatus of FIG. 1A, and the smart phone, with the upper section and the lower section of the apparatus of FIG. 1A connected together, and also a perspective view of an electrical outlet, and an electrical to USB adapter.

The right side or section 11 has an opening 12 which is used to gain access to control buttons 102 and 104 (such as control buttons for volume and mute) of the smart phone 100 shown in FIG. 3A and an opening 21 which is used to gain access to the control button 106 shown in FIG. 4A (such as power button) of the smart phone 100. The bottom side or section 15 has an opening 19 which is used for gaining access to a headphone or phono connector jack 108 of the smart phone 100, as shown in FIG. 4B. Additionally a lower part of lower section 8 contains openings 22, shown in FIG. 2, which redirect audio waves from the bottom of the smart phone 100 towards the front. This allows the user to experience sound from speakers of the smart phone 100 located near the openings 22 in a clearer manner and at a higher volume.

The body section 2 has an opening 10, shown in FIG. 1A which is used to expose a camera lens 110 of the smart phone 100 as shown in FIG. 3A. In general, in at least one embodiment, openings are provided in apparatus 1 to expose smart phone control buttons or functions.

The apparatus 1 includes an adjustable mounting bracket 16, shown in FIG. 1A, which is used to mount the apparatus 1 to any compatible media outlet such as outlet 204 of electrical to USB adapter 200 shown in FIG. 4A. This is done by extending the standard media plug 4 outwards and inserting it into a compatible female outlet, such as outlet 204, thereby supporting the weight of the combination of the apparatus 1 and the smart phone 100 directly through the standard media plug outlet 4.

The apparatus 1 includes an individual electronic device connector 18, shown in FIG. 2, which is used to connect to a compatible female connection of an electronic device, such as the smart phone 100. Alternatively, the individual electronic device connector 18 could be replaced by or be used along with a standard phono male plug which could connect to the phono connector jack 108 of device 100. The individual electronic device connector 18 may be built into the bottom side or section 15 of the apparatus 1 and/or into the rear of the lower section 8 of the body section 2, as shown by FIG. 2. The individual electronic device connector 18 may also be built anywhere along the inner walls of apparatus 1 where it connects to the compatible female outlet of the electronic device or smart phone 100.

Figure 6A:
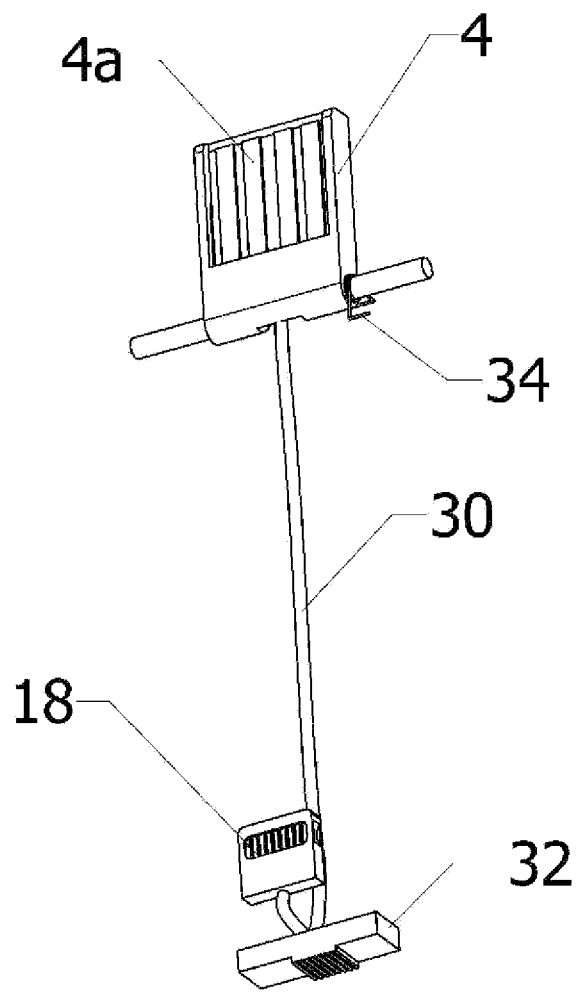
FIG. 6A shows a diagram of a standard media plug connector connected to a data switch which is also connected to an individual electronic device connector.
Figure 6B:
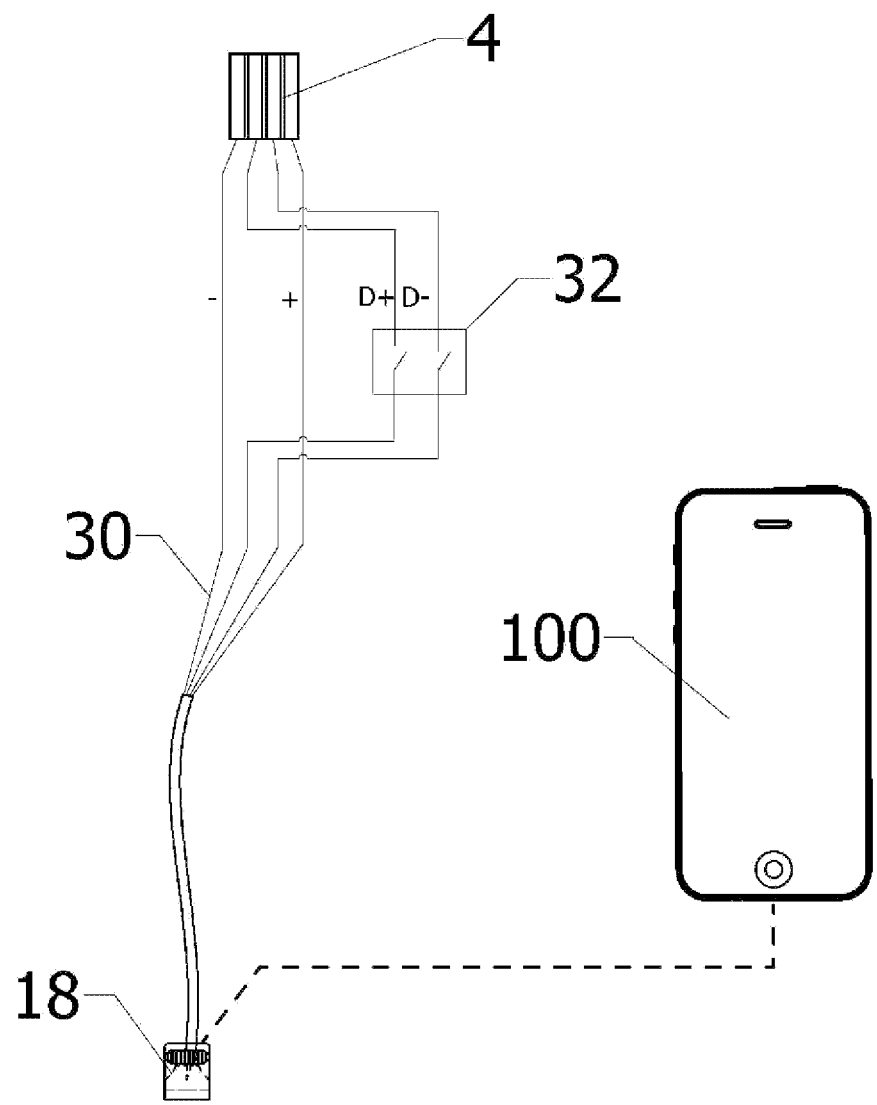
FIG. 6B shows a diagram of the standard media plug connector connected to the smart phone of FIG. 5A and connected to a switch which disconnects the flow of data between the media plug and the individual electronic device connector and media contacts located within the standard media plug body.

The body section 2 may be comprised, in at least one embodiment, of two separate interlocking pieces, upper section 3 and lower section 8. The upper section 3 of the body section 2, typically, must first be separated from the lower section 8 of the body section 2. A mobile electronic device, such as a cellular smart telephone 100 or tablet computer, is typically slid into the lower section 8 (upwards or sideways depending on the location of device connector 18) of the body section 2, shown in FIGS. 3A and 3B, partially and then completely, until reaching the bottom of the lower section 8, typically at the juncture with the bottom side or section 15. There, the electronic device or mobile device 100 connection connects with its compatible individual electronic device connector 18 and an electronic connection is made between the mobile device or smart phone 100 and the apparatus 1 or device case 1 as shown by FIG. 6B.

The two device encasement pieces, or upper section 3 and lower section 8, are then connected and are interlocked together, engulfing and locking the mobile device or smart phone 100 securely in place. The collapsible standard media plug connector 4 is then rotated and/or raised out of its resting place within the chamber of the adjustable mounting bracket 16 or the body section 2 or body section encasement wall. The attached and/or connected standard media plug connector 4, is then raised to a ninety degree angle, such as shown in FIG. 4C, relative to the plane of the device encasement back wall, such as the plane of the surface 2b shown in FIG. 2. In at least one embodiment, this is done by a person manually raising the standard plug connector 4 with the person's finger. Alternatively, in another embodiment, this is done by utilizing a spring mechanism 34 shown in FIG. 6A to raise and extend the standard media plug connector 4 outwards. In this alternative embodiment, a button 20, shown in FIG. 1B, may be used to disengage a loaded spring mechanism 34 which will automatically extend the standard media connector plug 4 outwards to ninety degrees as shown in FIG. 1B.

The standard media plug connector 4 along with the apparatus 1 and the smart phone 100 as shown in FIG. 4A can now be plugged into a compatible standard media outlet jack or plug 200 such as USB, stereo, HDMI or RCA outlet. After, the mobile device or smart phone 100 is plugged into such a media outlet jack 200, the mobile device or smart phone 100 physically mounted on the media outlet jack or plug 200 and an electronic connection is made between the mobile device 100 and a host device, such as powered USB ports in the car or home, personal computers, audio/Video receivers, televisions and car radios through the media outlet jack 200. The mobile device 100 can now be used to interact with a host device in order to transfer data such as music, pictures, video or any other data compatible with the two devices. Additionally, the mobile device 100 can also use the host device power to charge its internal battery for later use.

In one instance where the host device's media outlet jack 200 differs from its corresponding standard media plug 4, a universal media plug adapter 310 can be similarly used to connect between the mismatching media connection types. The matching standard media plug can now be connected to a host device 300, which in this example is also car radio 300, appropriately as shown in FIGS. 5A and 5B.

Figure 5A:
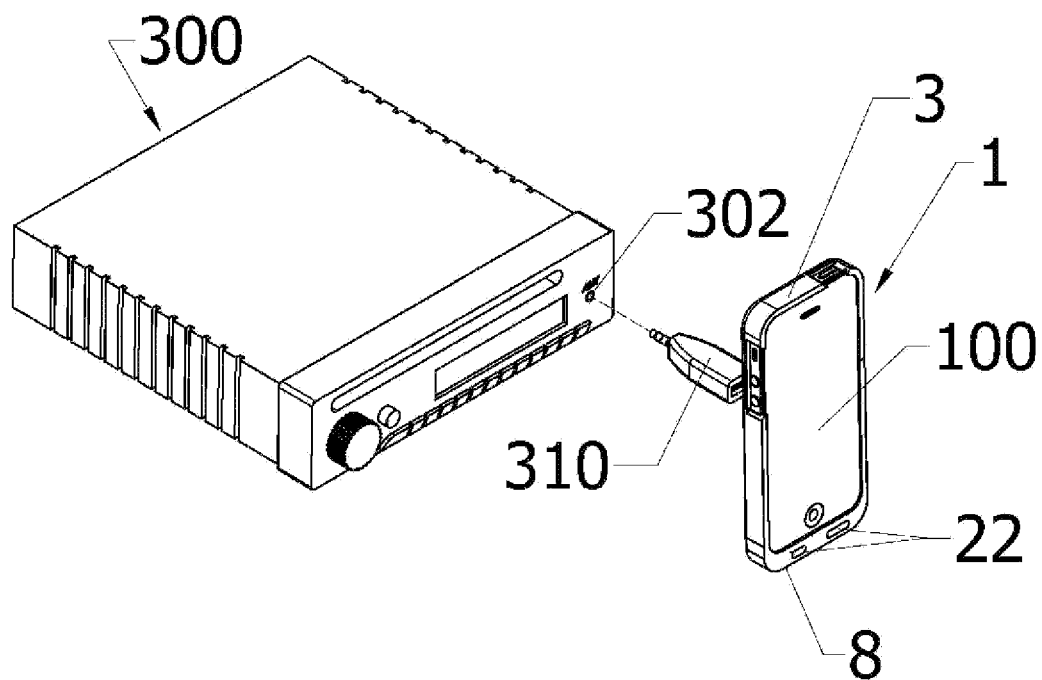
FIG. 5A shows a perspective view of a car radio, a media plug adapter, and the apparatus of FIG. 1A with the smart phone.
Figure 5B:
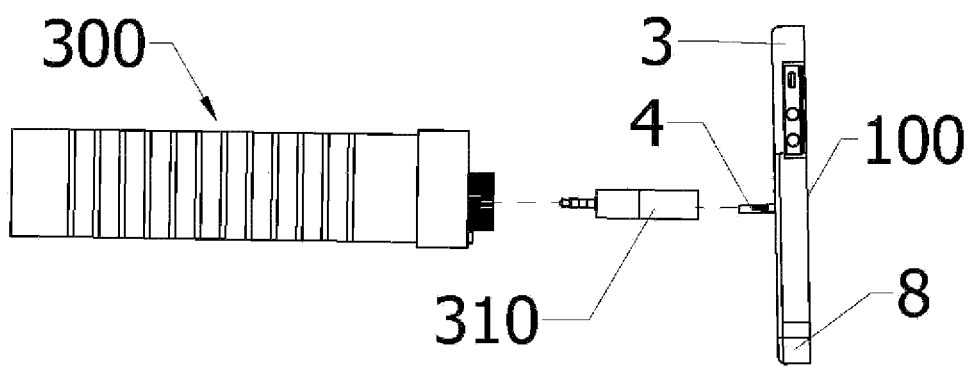
FIG. 5B shows a side view of the car radio, the media plug adapter, and the apparatus of FIG. 1A with the smart phone.

FIG. 5A shows a perspective view of a car radio 300, a universal media plug adapter 310, and the apparatus 1 of FIG. 1A with the smart phone 100. FIG. 5B shows a side view of the car radio 300, the universal media plug adapter 310, and the apparatus 1 of FIG. 1A with the smart phone 100.

The upper section 3 and the lower section 8, which make up the body section 2 of the apparatus 1 or device encasement 1, as well as the adjustable mounting bracket 16 can be molded into shape using conventional molding techniques. The standardized individual device connector plug 18, the standard media plug connector 4 and the Internal wiring harness 30 and the switch 32 shown in FIG. 6B, embedded into the body section 2, in at least one embodiment, may be purchased by an outside vendor and affixed to the assembly or apparatus 1, using glue, screws and/or small metal brackets. The standard media plug 4 body may be attached to the adjustable mounting bracket 16 mechanically forming an adjustable joint. Likewise the adjustable mounting bracket 16 may be mechanically affixed to the body walls, such as to surface 8b of the lower section 8 by encapsulating or sandwiching it between the outer and inner walls of apparatus 1 or another way which will allow position adjustment of the standard media plug connector 4 relative to the body section 2 of the apparatus or device encasement 1.

Figure 4D:
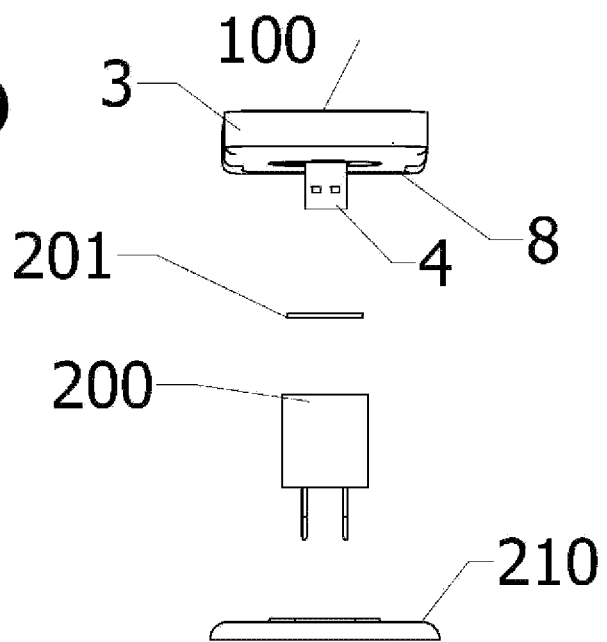
FIG. 4D shows a bottom view of the electrical outlet, electrical to USB adapter, and the apparatus of FIG. 1A with the smart phone.

In at least one embodiment, a standard media plug connector 4 is preferred and enables the apparatus 1 in cooperation with the mobile device 100 to function. In addition, a magnetized sheet 201 may be affixed to the facing surface of 200 as shown in FIG. 4D and attract to the metal or matching magnetic surface of section 8a. This may be necessary for holding the mobile device 100 in place as it is mounted to the plug 200. A wired connection between the Individual electronic device connector 18 and the standard media plug connector 4, in at least one embodiment, is typically necessary for the mobile device 100 to charge and exchange data. The standard media plug connector 4 could be replaced with another non-standard media plug connector having a compatible non-standard media outlet jack which could carry data and/or electric power. When using a standard USB connector, the rectangular metal frame around the connector, could be detachable, collapsible or non existent when folded into adjustable mounting bracket 16 or into chamber 2a of the body section 2. This would make the USB connector smaller in profile which would in turn allow the body section 2 of the apparatus 1 to be designed thinner and to have a smaller profile as shown in FIG. 3A.

In at least one embodiment, as shown in FIG. 6B, a switch 32 is used which disconnects data transmission between the mobile device 100 and the host device and gives the mobile device 100 the ability to be controlled as a stand-alone unit when connecting to certain host devices which the mobile device 100 desires to communicate with as shown in FIG. 1A.

The collapsible mounting bracket 16 may be implemented in many ways or may be replaced by alternative devices in one or more further embodiments. The bracket 16 may be stationary or adjustable and may have the ability to lock or not lock in place. The bracket 16 could lock in multiple positions allowing for tilting of the mobile device in a more comfortable angle to the user as shown in FIG. 4A. The adjustable mounting bracket 16 may also have a single or multiple axis of movement but would still perform an identical function. Similarly, the body of collapsible standard media plug 4 may be configured in various shapes and sizes and be either collapsible or not.

The body section 2 can be configured in various shapes and sizes encapsulating/protecting the mobile device 100 or not.

In use, in at least one embodiment of the present application, the apparatus 1 could be used to mount onto, charge and transfer data between a user's mobile device, such as 100 and any compatible host device having some type of standard media jack outlet. One example would be using the apparatus 1 to mount a mobile phone, such as 100, directly onto the faceplate of a car stereo having a USB port thereby using the mobile phone 100 as a new fully functioning interface to control the car's stereo system. Another would be using the apparatus 1 to plug a mobile device, or cellular telephone, into a USB outlet of a computer. In the event where a USB jack outlet, such as 200 isn't available on the radio panel, a universal media plug such as plug 310 in FIG. 5A and FIG. 5B, could be used with one or more embodiments of the present invention to connect to an auxiliary input 302 of a car radio 300 as shown in FIGS. 5A and 5B.

Another example would be using the apparatus 1 to mount a cellphone 100 directly onto the wall using a standard USB power jack 200 as shown in FIGS. 4A and 4B. The user would then be able to interact with the phone 100 comfortably like a computer while it is charging. This could be useful for students in a library setting where many tables have outlets, such as outlet 210 available at eyelevel for use with laptop computers. Alternatively, these outlets could be used to mount an internet enabled device in order to download coursework for studying. Hanging the apparatus 1 and the smart phone 100 shown in FIG. 4A on the wall provides more room on the desk surface and leaves the user with an available hand for writing while he uses the device 100.

The "built-in" mounting system allows for the mounting of various mobile electronic devices, such as smart phones, in a more aesthetic way. As the universal media plug connector 4 fits into its appropriate media outlet jack, such as 200, it disappears from site. The mounting system is therefore not visible, in at least one embodiment, and the user is left to focus only on the screen of the mobile device 100 that is displayed. This could be beneficial for presentations, small store displays, for digital picture displays in the home or to use the mobile device as a small hanging television. Additionally, many airlines recently began permitting the use of mobile electronics onboard flights. These airlines provide standard USB outlets on the back of the airplanes seats which could be used to charge and mount a mobile device, such as 100, during long flights.

The mounting system, of one or more embodiments of the present invention, eliminates the need for using separate power and data cables. These cables are cumbersome to carry around, often get tangled and are many times forgotten when on the go. One or more embodiments solve this problem by having all the necessary device utilities built into the body section 2.

Also, once extended, the protruding universal media plug connector 4 in the back of the protective encasement or apparatus 1 can also be used as a "kick-stand" in order to display and interact with the mobile device 100 in a more comfortable way.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a housing having a back surface, a first side, and an opposing second side;
   a standard media plug connector rotatably mounted to the housing, so that the standard media plug connector can be rotated in a first plane, which is substantially perpendicular to the back surface of the housing, from a first orientation wherein the standard media plug connector is substantially parallel to the back surface of the housing to a second orientation wherein the standard media plug connector is substantially perpendicular to the back surface of the housing;
   wherein the housing is configured to be attached to a mobile electronic communications device;
   wherein the first side and the opposing second side of the housing are connected to the back surface of the housing so that the first side and the opposing second side of the housing are substantially perpendicular to the back surface of the housing with the back surface of the housing in between and separating the first side of the housing from the opposing second side of the housing;
   wherein the first side of the housing and the opposing second side of the housing are substantially parallel to each other;
   wherein the first side, the opposing second side, and the back surface of the housing are configured with respect to each other, such that the mobile electronic communications device can be located between the first side and the opposing second side of the housing and simultaneously a back surface, a first side, and a second side of the mobile electronic communications device can be aligned with and substantially covered by the back surface, the first side and the second side of the housing, respectively; and
   further comprising a mounting bracket to which the standard media plug connector is mounted; and
   wherein the mounting bracket is rotatably mounted to the housing such that the mounting bracket is configured to rotate in a second plane which is substantially parallel to the back surface of the housing, while the standard media plug connector is substantially parallel to the back surface of the housing; and
   wherein the mounting bracket is rotatably mounted to the housing such that the mounting bracket is configured to rotate in the second plane, while the standard media plug connector is substantially perpendicular to the back surface of the housing.

2. The apparatus of claim 1 further comprising
   an electronic device connector which is configured to be connected to a data port of the mobile electronic communications device, while the housing is attached to the mobile electronic communications device; and
   wherein the electronic device connector is mounted to the housing and is electronically connected to the standard media plug connector.

3. The apparatus of claim 1
   further comprising the mobile electronic communications device.

4. The apparatus of claim 1 wherein
   the standard media plug connector is a universal serial bus connector.

5. A method comprising the steps of:
   attaching a housing to a mobile electronic communications device; and
   wherein the housing has a back surface, a first side, and an opposing second side;
   wherein a standard media plug connector is rotatably mounted to the housing, so that the standard media plug connector can be rotated in a first plane, which is substantially perpendicular to the back surface of the housing, from a first orientation wherein the standard media plug connector is substantially parallel to the back surface of the housing to a second orientation wherein the standard media plug connector is substantially perpendicular to the back surface of the housing;

wherein the first side and the opposing second side of the housing are connected to the back surface of the housing so that the first side and the opposing second side of the housing are substantially perpendicular to the back surface of the housing with the back surface of the housing in between and separating the first side of the housing from the opposing second side of the housing;

wherein the first side of the housing and the opposing second side of the housing are substantially parallel to each other;

wherein the first side, the opposing second side, and the back surface of the housing are configured with respect to each other, such that the mobile electronic communications device can be located between the first side and the opposing second side of the housing and simultaneously a back surface, a first side, and a second side of the mobile electronic communications device can be aligned with and substantially covered by the back surface, the first side and the second side of the housing, respectively;

wherein the standard media plug connector is mounted to a mounting bracket;

wherein the mounting bracket is rotatably mounted to the housing such that the mounting bracket is configured to rotate in a second plane which is substantially parallel to the back surface of the housing, while the standard media plug connector is substantially parallel to the back surface of the housing; and wherein the mounting bracket is rotatably mounted to the housing such that the mounting bracket is configured to rotate in the second plane, while the standard media plug connector is substantially perpendicular to the back surface of the housing.

6. The method of claim 5 further comprising
connecting the standard media plug connector to a universal serial bus port.

7. The method of claim 5 further comprising
connecting an electronic device connector to a data port of the mobile electronic communications device, while the housing is attached to the mobile electronic communications device; and wherein the electronic device connector is mounted to the housing and is electronically connected to the standard media plug connector.

8. The method of claim 5 wherein
the standard media plug connector is a universal serial bus connector.

9. The apparatus of claim 1 wherein
the housing includes a third side and an opposing fourth side;

wherein the third side and the opposing fourth side of the housing are connected to the back surface of the housing so that the third side and the opposing fourth side of the housing are substantially perpendicular to the back surface of the housing with the back surface of the housing in between and separating the third side of the housing from the opposing fourth side of the housing;

wherein the third side of the housing and the opposing fourth side of the housing are substantially parallel to each other;

wherein the third side of the housing and the opposing fourth side of the housing are substantially perpendicular to both the first side and the opposing second side of the housing;

wherein the first side, the opposing second side, the third side, the opposing fourth side, and the back surface of the housing are configured with respect to each other, such that the mobile electronic communications device can be located between the first side and the opposing second side of the housing, simultaneously between the third side and the opposing fourth side of the housing, and simultaneously the back surface, the first side, the second side, a third side, and a fourth side of the mobile electronic communications device can be aligned with and substantially covered by the back surface, the first side, the opposing second side, the third side, and the opposing fourth side of the housing, respectively.

10. The apparatus of claim 1 wherein
the first side of the housing has an opening through which one or more control buttons of the mobile electronic communications device can be accessed when the mobile electronic communications device is located between the first side and the opposing second side of the housing and simultaneously the back surface, the first side, and the second side of the mobile electronic communications device is aligned with and substantially covered by the back surface, the first side and the second side of the housing, respectively.

11. An apparatus comprising:
a housing having a back surface, a first side, and an opposing second side;

a standard media plug connector rotatably mounted to the housing, so that the standard media plug connector can be rotated in a first plane, which is substantially perpendicular to the back surface of the housing, from a first orientation wherein the standard media plug connector is substantially parallel to the back surface of the housing to a second orientation wherein the standard media plug connector is substantially perpendicular to the back surface of the housing; and wherein the housing is configured to be attached to a mobile electronic communications device;

wherein the first side and the opposing second side of the housing are connected to the back surface of the housing so that the first side and the opposing second side of the housing are substantially perpendicular to the back surface of the housing with the back surface of the housing in between and separating the first side of the housing from the opposing second side of the housing;

wherein the first side of the housing and the opposing second side of the housing are substantially parallel to each other;

wherein the first side, the opposing second side, and the back surface of the housing are configured with respect to each other, such that the mobile electronic communications device can be located between the first side and the opposing second side of the housing and simultaneously a back surface, a first side, and a second side of the mobile electronic communications device can be aligned with and substantially covered by the back surface, the first side and the second side of the housing, respectively;

wherein
the back surface of the housing has an opening through which a camera lens of the mobile electronic communications device is exposed when the mobile electronic communications device is located between the first side and the opposing second side of the housing and simultaneously the back surface, the first side, and the second side of the mobile electronic communications device are aligned with and substantially covered by the back surface, the first side and the second side of the housing, respectively.

12. The apparatus of claim 9 wherein
the housing is comprised of an upper section and a lower section;
the lower section includes part of the back surface of the housing, part of the first side of the housing, part of the opposing second side of the housing, and the third side of the housing;
the upper section includes part of the back surface of the housing, part of the first side of the housing, part of the opposing second side of the housing, and the opposing fourth side of the housing;
and wherein the upper and lower sections of the housing are configured to connect to each other and to simultaneously attach to the mobile electronic communications device.

13. The apparatus of claim 1 wherein
the standard media plug connector is rotatably mounted to a recessed portion of the back surface of the housing.

14. An apparatus comprising:
a housing having a back surface, a first side, and an opposing second side;
a standard media plug connector rotatably mounted to the housing, so that the standard media plug connector can be rotated in a first plane, which is substantially perpendicular to the back surface of the housing, from a first orientation wherein the standard media plug connector is substantially parallel to the back surface of the housing to a second orientation wherein the standard media plug connector is substantially perpendicular to the back surface of the housing; and
wherein the housing is configured to be attached to a mobile electronic communications device;
wherein the first side and the opposing second side of the housing are connected to the back surface of the housing so that the first side and the opposing second side of the housing are substantially perpendicular to the back surface of the housing with the back surface of the housing in between and separating the first side of the housing from the opposing second side of the housing;
wherein the first side of the housing and the opposing second side of the housing are substantially parallel to each other;
wherein the first side, the opposing second side, and the back surface of the housing are configured with respect to each other, such that the mobile electronic communications device can be located between the first side and the opposing second side of the housing and simultaneously a back surface, a first side, and a second side of the mobile electronic communications device can be aligned with and substantially covered by the back surface, the first side and the second side of the housing, respectively;
wherein the standard media plug connector is rotatably mounted to a recessed portion of the back surface of the housing; and
wherein
the recessed portion of the back surface of the housing is substantially circular.

15. The apparatus of claim 14 wherein
the standard media plug connector is configured with respect to the back surface of the housing so that when in the first orientation the standard media plug connector is substantially aligned with the back surface of the housing.

16. The apparatus of claim 12 wherein
the housing is configured so that the mobile electronic communications device can slide into the lower section of the housing to attach the lower section of the housing to the mobile electronic communications device and with the lower section of the housing attached to the mobile electronic communications device, the upper section of the housing can be placed on the mobile electronic communications device and connected to the lower section of the housing.

17. The method of claim 5 wherein
the housing includes a third side and an opposing fourth side;
wherein the third side and the opposing fourth side of the housing are connected to the back surface of the housing so that the third side and the opposing fourth side of the housing are substantially perpendicular to the back surface of the housing with the back surface of the housing in between and separating the third side of the housing from the opposing fourth side of the housing;
wherein the third side of the housing and the opposing fourth side of the housing are substantially parallel to each other;
wherein the third side of the housing and the opposing fourth side of the housing are substantially perpendicular to both the first side and the opposing second side of the housing;
wherein the first side, the opposing second side, the third side, the opposing fourth side, and the back surface of the housing are configured with respect to each other, such that the mobile electronic communications device can be located between the first side and the opposing second side of the housing, simultaneously between the third side and the opposing fourth side of the housing, and simultaneously the back surface, the first side, the second side, a third side, and a fourth side of the mobile electronic communications device can be aligned with and substantially covered by the back surface, the first side, the opposing second side, the third side, and the opposing fourth side of the housing, respectively.

18. The method of claim 5 wherein
the first side of the housing has an opening through which one or more control buttons of the mobile electronic communications device can be accessed when the mobile electronic communications device is located between the first side and the opposing second side of the housing and simultaneously the back surface, the first side, and the second side of the mobile electronic communications device is aligned with and substantially covered by the back surface, the first side and the second side of the housing, respectively.

19. A method comprising the steps of:
attaching a housing to a mobile electronic communications device; and
wherein the housing has a back surface, a first side, and an opposing second side;
wherein a standard media plug connector is rotatably mounted to the housing, so that the standard media plug connector can be rotated in a first plane, which is substantially perpendicular to the back surface of the housing, from a first orientation wherein the standard media plug connector is substantially parallel to the back surface of the housing to a second orientation wherein the standard media plug connector is substantially perpendicular to the back surface of the housing;
wherein the first side and the opposing second side of the housing are connected to the back surface of the housing so that the first side and the opposing second side of the housing are substantially perpendicular to the back surface of the housing with the back surface of the housing in between and separating the first side of the housing from the opposing second side of the housing;

wherein the first side of the housing and the opposing second side of the housing are substantially parallel to each other; and wherein the first side, the opposing second side, and the back surface of the housing are configured with respect to each other, such that the mobile electronic communications device can be located between the first side and the opposing second side of the housing and simultaneously a back surface, a first side, and a second side of the mobile electronic communications device can be aligned with and substantially covered by the back surface, the first side and the second side of the housing, respectively;

wherein the back surface of the housing has an opening through a camera lens of the mobile electronic communications device is exposed when the mobile electronic communications device is located between the first side and the opposing second side of the housing and simultaneously the back surface, the first side, and the second side of the mobile electronic communications device are aligned with and substantially covered by the back surface, the first side and the second side of the housing, respectively.

20. The method of claim 17 wherein the housing is comprised of an upper section and a lower section;

the lower section includes part of the back surface of the housing, part of the first side of the housing, part of the opposing second side of the housing, and the third side of the housing;

the upper section includes part of the back surface of the housing, part of the first side of the housing, part of the opposing second side of the housing, and the opposing fourth side of the housing;

and wherein the upper and lower sections of the housing are configured to connect to each other and to simultaneously attach to the mobile electronic communications device.

21. The method of claim 5 wherein the standard media plug connector is rotatably mounted to a recessed portion of the back surface of the housing.

22. A method comprising the steps of:

attaching a housing to a mobile electronic communications device; and wherein the housing has a back surface, a first side, and an opposing second side;

wherein a standard media plug connector is rotatably mounted to the housing, so that the standard media plug connector can be rotated in a first plane, which is substantially perpendicular to the back surface of the housing, from a first orientation wherein the standard media plug connector is substantially parallel to the back surface of the housing to a second orientation wherein the standard media plug connector is substantially perpendicular to the back surface of the housing;

wherein the first side and the opposing second side of the housing are connected to the back surface of the housing so that the first side and the opposing second side of the housing are substantially perpendicular to the back surface of the housing with the back surface of the housing in between and separating the first side of the housing from the opposing second side of the housing;

wherein the first side of the housing and the opposing second side of the housing are substantially parallel to each other;

wherein the first side, the opposing second side, and the back surface of the housing are configured with respect to each other, such that the mobile electronic communications device can be located between the first side and the opposing second side of the housing and simultaneously a back surface, a first side, and a second side of the mobile electronic communications device can be aligned with and substantially covered by the back surface, the first side and the second side of the housing, respectively;

wherein the standard media plug connector is rotatably mounted to a recessed portion of the back surface of the housing; and wherein the recessed portion of the back surface of the housing is substantially circular.

23. The method of claim 22 wherein the standard media plug connector is configured with respect to the back surface of the housing so that when in the first orientation the standard media plug connector is substantially aligned with the back surface of the housing.

24. The method of claim 20 wherein the housing is configured so that the mobile electronic communications device can slide into the lower section of the housing to attach the lower section of the housing to the mobile electronic communications device and with the lower section of the housing attached to the mobile electronic communications device, the upper section of the housing can be placed on the mobile electronic communications device and connected to the lower section of the housing.

* * * * *